T. F. GLENN.
ARTIFICIAL TOOTH AND THE METHOD OF PRODUCING THE SAME.
APPLICATION FILED AUG. 31, 1915.

1,187,520.

Patented June 20, 1916.

Inventor
Thomas F. Glenn,
By
Clifton C. Hallowell
Attorney

Witnesses
William J. Russell
R. B. Savin

UNITED STATES PATENT OFFICE.

THOMAS F. GLENN, OF ARDMORE, PENNSYLVANIA.

ARTIFICIAL TOOTH AND THE METHOD OF PRODUCING THE SAME.

1,187,520.            Specification of Letters Patent.     Patented June 20, 1916.

Application filed August 31, 1915. Serial No. 48,157.

*To all whom it may concern:*

Be it known that I, THOMAS F. GLENN, a citizen of the United States, and a resident of Ardmore, in the county of Montgomery, State of Pennsylvania, have invented certain new and useful Improvements in Artificial Teeth and the Method of Producing the Same, of which the following is a specification, reference being had to the accompanying drawings.

My invention relates to the manufacture of artificial teeth, particularly to tooth facings, and is especially directed to the method of truing and facing the interior surfaces of the recess with which the tooth supporting structure is to be engaged.

The commercial success of all artificial tooth facings depends wholly upon their interchangeability, and, consequently, upon the accuracy of the relative position of the surfaces which coact with the backing or support, to effect the desired rigidity by snugly fitting and interlocking with the corresponding opposed surfaces thereof.

The principal objects of my invention are, to provide an artificial tooth having a slotted undercut retaining recess whose surfaces are finished or faced by grinding to a predetermined relation with respect to the external surfaces of the tooth; and to provide a method of so manipulating the grinding tool as to effect the results desired.

Specifically stated, my invention comprehends the method of truing and facing the interior surfaces of the undercut recesses in fired or baked artificial teeth, which consists in relatively moving, in operative engagement with said surfaces, a rotatable headed tool and the tooth to be trued, in a direction transverse with respect to the axis of rotation of said tool while the tool head is disposed within the undercut recess and operatively engaging the undercut surfaces.

My invention also includes all of the various novel features of the method of producing artificial teeth and the structure so formed, as will be hereinafter more definitely specified.

Figure 1:
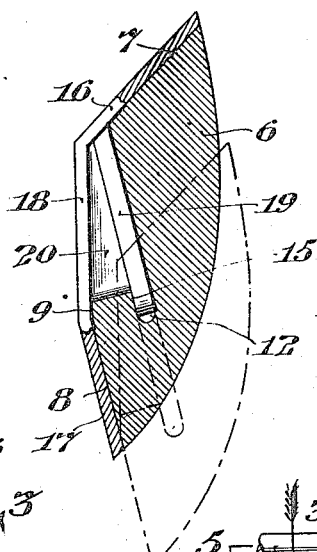
Figure 2:
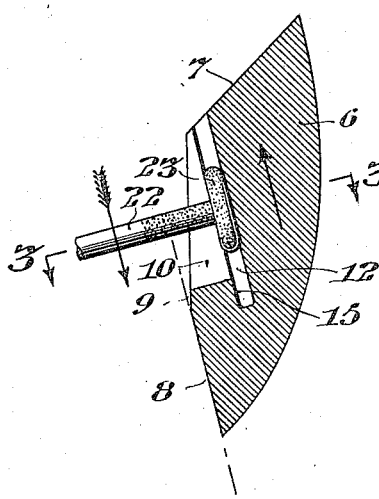
Figure 4:
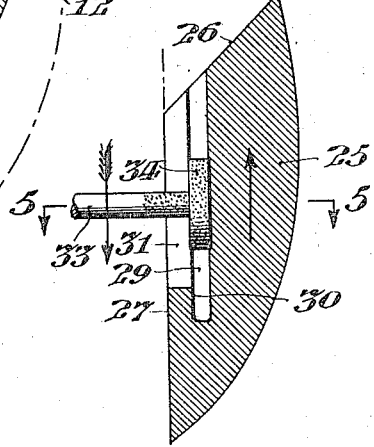
Figure 3:
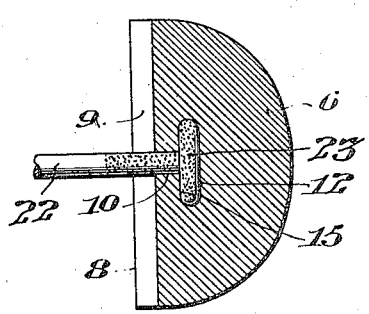
Figure 5:
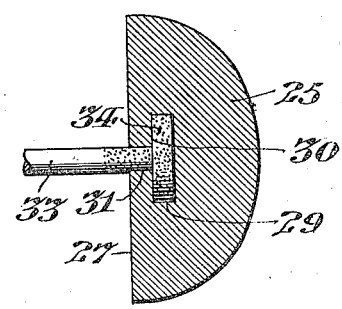

In the accompanying drawings, Figure 1 is a central longitudinal sectional view of a tooth facing, formed in accordance with my invention and engaged with its backing; Fig. 2 is a central longitudinal sectional view of the tooth facing shown in Fig. 1, showing the method of grinding and truing the surfaces of the retaining recess; Fig. 3 is a transverse sectional view of the structure shown in Fig. 2, taken on the line 3—3 in said figure; Fig. 4 is a central longitudinal sectional view of a different form of tooth from that shown in Figs. 1 to 3, inclusive, and to which my invention is equally applicable; and Fig. 5 is a transverse sectional view of the structure illustrated in Fig. 4, taken on the line 5—5 in said figure.

In the form of tooth facing shown in Figs. 1 to 3, inclusive, to which my invention is readily applicable, the tooth body 6, which may be preferably composed of porcelain, has its lingual face formed of relatively angular surfaces, comprising the "ridge-lap" 7, "bite" 8, and the intervening or lingual surface, commonly termed the "shut", 9, said "ridge-lap" and "bite" being disposed in labially oblique relation with respect to said "shut" surface 9.

The body of the tooth facing 6 is provided in its lingual face with a recess, which may be in the form of an undercut slot or groove 10, extending longitudinally of the facing and comprising a broad, flat cavity 12, having its lingual surface 15 substantially parallel with the plane of the "bite" surface 8.

The lingual face of the tooth facing above described is arranged to be clothed by the backing comprising the relatively angular walls 16, 17 and 18, respectively overlying the "ridge-lap", the "bite" and the "shut" surfaces of the lingual face of the tooth facing body 6. Said backing is provided with an anchor bracket or tongue 19, which is arranged in the same angular relation to the wall 18 of the backing as the lingual surface 15 of the recess in the tooth facing 6 is to the "shut" surface 9 of said tooth facing, and which is arranged to snugly fit the cavity 12 in said tooth facing 6, being connected with the backing wall 18 by the relatively narrow web 20, which is preferably arranged to accurately fit the slot or groove 10 in the tooth facing body 6.

The lingual surface of the tongue 19 is disposed in substantially parallel relation to the "bite" wall 17 of the backing, so that the tooth facing 6 may be engaged with the backing, gingivally, from the position shown in dot and dash lines to the position shown in full lines, wherein the opposing surfaces of the tooth and its backing absolutely conform to each other and snugly fit together.

It will be readily seen that in order that the facing and its backing shall be assembled in absolute conformity with each other, it is necessary that the lingual surface 15 of the recess 12 shall be absolutely the same distance from the plane of the "bite" surface 8, as the lingual surface of the tongue 19 is from the labial "bite" surface of the backing wall 17, and, therefore, to effect the necessary fit, must be ground to substantially micrometric gage. In order to effect such grinding of the interior surfaces of the recess 12 and its slot 10, I provide a rotatable tool having the shank 22 provided with a head 23, of larger diameter than said shank 22 and of any desired contour, depending upon the shape of the recess to be ground, which, as shown in Figs. 1, 2 and 3, is broad and flat, having rounded edges and extending obliquely to the back or "shut" surface 9 of the tooth, and substantially parallel with respect to the "bite" surface 8. The grinding tool, as shown in Fig. 2, may be conveniently entered from the gingival end of the tooth and progressed longitudinally thereof through said slot and recess, as indicated by the arrow extending across the shank thereof, in a direction transverse with respect to the axis of rotation of said tool, which axis it will be noted is transverse with respect to the back or lingual surface of the tooth; or, said tool may rotate about a stationary axis while the tooth body 6 may be progressed with respect to the tool in the direction of the arrow indicated thereon, on the plane of the "bite" surface 8, indicated by the dot and dash lines in Fig. 2. In either instance, however, whether the tool is moved with respect to the tooth, or whether the tooth is moved with respect to the tool, said tool is caused to traverse said recess and its slot to its incisive end, and thereby grind all its surfaces to a predetermined relation with respect to the back or lingual face of the tooth.

It will be noted that my method of truing and facing the internal surfaces of the recess in a tooth facing may be as readily applied to different forms of tooth-facings; for instance, as shown in Figs. 4 and 5, the tooth body 25 is provided with a "ridge-lap" 26, and its lingual or "shut" surface 27 extends in a plane to the incisive edge. In other words, the "bite" surface (if it may be so called in this form of tooth) adjoining the incisive edge is in a common plane with that portion commonly termed the "shut" surface.

The tooth body 25 is provided with a slotted undercut recess 29, whose lingual surface 30 extends substantially parallel with the lingual or "shut" surface of the tooth, extending incisively from the gingival end, through the "ridge-lap" 26, toward the incisive end, and terminating short thereof.

In order to effect the grinding of the interior surfaces of the recess 29 and its slot 31, the tool comprising the shank 33 and head 34 (which it will be noted has its peripheral edge cylindriform) may be progressed through said recess 29 and its slot 31, with its axis disposed transverse and normal to the lingual surface 27, in the direction of the arrow indicated across its shank 33 to the incisive termination of said recess and its slot; or, the tooth body 25 may be progressed with respect to the tool, as described with respect to Fig. 2, in the direction of the arrow indicated thereon.

It will thus be seen that my method of truing and facing recesses in tooth facings may be applied to any form of tooth having a recess, and that the recess is practically unlimited in the form of its cross-sectional area; for instance, the recess shown in Fig. 3 is broad and flat, having its lateral edges rounded, while the recess shown in Fig. 5 is broad and flat with its lateral edges straight, forming a substantially rectangular cavity. Similarly, the recess may be modified into any desired shape by providing a tool with a head having a shape similar to the cross-sectional design of the recess desired; for instance, the tool may be provided with a head which is conical, thus forming a recess of triangular cross-sectional area; or, the head may be dome-shaped, forming a segmental or a sectoral recess having a plane lingual wall or walls and a curved labial wall; or, the tool may be spherical, forming a cylindriform recess; and, in fact, said head may be of any desired shape to form a recess of corresponding contour, all of the varying shapes described being apparent from the description of the heads of the tools shown in the drawings, their illustration is deemed unnecessary.

The tooth facing having the slotted recess is baked or fired, with the dimensions of said recess very slightly less than the dimensions of the corresponding projections on the backing, so as to permit the surfaces of said recess and its slot to be ground and finished to the precise dimensions of the corresponding projections on said backing, so that when assembled they will absolutely fit in snug relation, thereby providing the desired rigidity, and forming to all intents and purposes an integral structure.

I do not desire to limit my invention to the precise details of construction and arrangement as herein set forth, as it is obvious that various modifications may be made therein without departing from the essential features of my invention as defined by the appended claims.

Having thus described my invention, I claim:

1. The method of truing and facing an undercut recess in an artificial tooth, which consists in progressing a rotatable headed tool therethrough in a direction transverse to the axis of rotation of said tool.

2. The method of truing and facing a slotted undercut recess in an artificial tooth, which consists in progressing a rotatable tool therethrough in a direction transverse to the axis of rotation of said tool, with an enlarged portion of said tool acting upon the undercut walls of said recess, and a relatively smaller portion acting upon the walls of the adjoining slot.

In witness whereof, I have hereunto set my hand this 30th day of August, A. D., 1915.

THOMAS F. GLENN.

Witnesses:
ROBINSON L. VAILL,
RICHARD H. MENG.